UNITED STATES PATENT OFFICE.

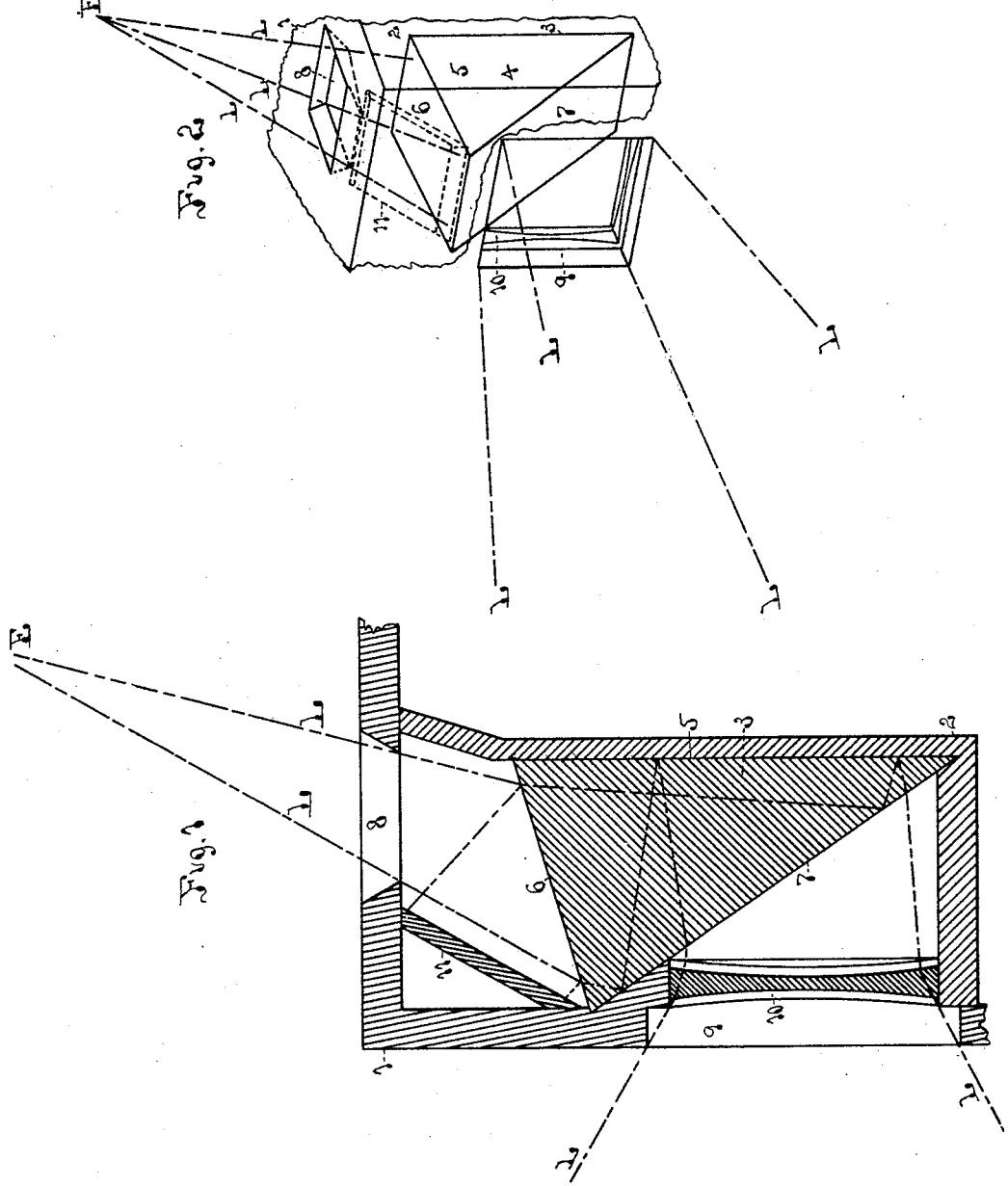

ALFRED CLIFFORD MERCER, OF SYRACUSE, NEW YORK.

PHOTOGRAPHIC FINDER.

SPECIFICATION forming part of Letters Patent No. 572,173, dated December 1, 1896.

Application filed January 24, 1896. Serial No. 576,635. (No model.)

*To all whom it may concern:*

Be it known that I, ALFRED CLIFFORD MERCER, of Syracuse, in the county of Onondaga and State of New York, have invented a new and useful Photographic Finder, of which the following, taken in connection with the accompanying drawings, is a specification.

The object of my invention is to produce a reduced, clear, upright, not-reversed-from-right-to-left, and brilliant image of exactly the same portion of a view or object that is to be photographed, this image being produced when the camera is held in a convenient position in front of the chest or abdomen and the eyes of the observer are directed conveniently obliquely (not perpendicularly) downward toward the finder.

In the accompanying drawings, Figure 1 is a longitudinal vertical section through my finder and the portion of the camera to which it is or might be attached. Fig. 2 is an isometric projection of the same, part of the camera-box being broken away.

While my finder might be inclosed in a separate box attached to the outside of the camera-box, I prefer (and the character of my finder allows me) to place it within the camera-box in a portion partitioned off for the purpose. The camera-box is numbered 1 and the partition 2. In this partitioned-off portion is supported a triangular glass prism 3, having triangular end surfaces 4 and rectangular faces 5 6 7. I polish the three plane faces 5 6 7 and silver the surface 5. I provide an aperture 8 in the top and an aperture 9 in the front of the partitioned-off portion of the camera-box of the relative proportion hereinafter specified, and in the front aperture 9 I fit a negative lens 10. Now when light L L from the object enters the aperture 9 through the negative lens 10 it pierces the face 7, passes to the silvered face 5, is reflected back to the face 7, suffers total reflection, (as presently explained,) and passes out through the face 6 and opening 8 to the eye E.

I am especially particular to make the angles formed by the faces 5 6 7 with each other and with the vertical such that while the face 7 freely transmits the entering light it totally reflects the light returned to it from the face 5. In the figures the four extreme rays of light from the view are shown.

To effect the above-mentioned total reflection in the best manner, I find it advisable to make the lower angle of the triangular glass prism thirty-five degrees, the upper front angle seventy degrees, and the upper back angle seventy-five degrees, and to place the back surface 5 nearly vertical. This arrangement effects another object of my invention by resulting in tipping the face 6 at a considerably acute angle to the rays of light emitted through it. It is a well-known defect in finders that where the emitting-surface fronts the eye the face of the user, as well as the sky and other objects back of him, are seen reflected from the emitting-surface.

With my finder the refraction at the admitting-surface 7 is balanced by that at the emitting-surface 6, and thus I am enabled to incline the latter without producing fringes of prismatic color in the image. Being so enabled, I set a black screen 11 above the emitting-surface 6 in such a position as to be all that is reflected to the eye from said surface. The emitted image is thus preserved perfectly clear and brilliant. It is also upright and is not reversed from right to left, and in consequence the camera may be correctly pointed with great facility.

That the user may see exactly as much and no more of the field of vision as will appear in the photograph, I so proportion the apertures 8 and 9 that when the eye is at the right distance from the aperture 8 to see through it the precise limits of the photograph the aperture 9 will appear to be just the same size as the aperture 8. In other words, the apertures are of such relative size that their visual coincidence correctly locates the eye.

I am aware that devices exist whereby the eye can be known to be in the central line of the rays from the image; but the user, in looking into any finder, unconsciously ranges his eye approximately in that line, and what he really needs—and what I have invented—is a means of locating the exact point in the line from which the whole image and no more will be visible. It will be perceived that the negative lens 10 refracts the rays so that while the eye is held a foot or more from the aperture 8 and that aperture therefore subtends a small visual angle the limits of the view subtend a much larger angle as they enter the finder, so much larger, in fact, that there is no difficulty in making them correspond with the angle of whatever camera-lens may be used; or, to put it the other way, the lens throws back the converging-point of the rays, so that the position of the eye is natural when the camera is held naturally and firmly opposite the chest or abdomen.

I claim as new and of my invention—

1. In a photographic finder, the combination of: first, a negative lens suitably supported and fixed in the front opening of a box and perpendicularly to and first in the path of the light passing from the object or view through the finder to the eye; second, a triangular glass prism, suitably supported and fixed just behind the said negative lens, below a top opening in the said box and in the said path of light, having two polished internally-reflecting faces one of which, not silvered, is placed or cut at such an angle to the other which is silvered that the former or first face transmits one part of a ray or pencil of light on its way from the object or view to the latter or second face, and, simultaneously, totally reflects another, later, part of the same ray or pencil of light, on its way from the said second internally-reflecting face to the eye; third, a final upper emitting and refracting polished face of the said triangular glass prism, oblique to the now emitted and refracted said ray or pencil (or said path) of light and fixed at such an angle to a black screen, which is suitably supported and fixed in the said box just above and in front of the said triangular glass prism, that the said screen only is reflected to the eye by the said emitting and refracting face; fourth, two contours, one bounding the said front opening in the said box and the other bounding the said top opening in the said box, so proportioned as visually to coincide when the eye is correctly located in using the finder.

2. In a photographic finder, the combination of: first, a negative lens suitably supported and fixed in the front opening of a box and perpendicularly to and first in the path of the light passing from the object or view through the finder to the eye; with, second, a triangular glass prism suitably supported and fixed just behind the said negative lens, below a top opening in the said box and in the said path of light, having two polished internally-reflecting faces, one of which, not silvered, is placed or cut at such an angle to the other which is silvered that the former simultaneously transmits one part of, and totally reflects another part of, the same ray or pencil of light passing from the object or view through the finder to the eye; and with, third, a final upper emitting and refracting polished face of the said triangular glass prism, oblique to the now emitted and refracted said ray or pencil (or said path) of light, and fixed at such an angle to a black screen, which is suitably supported and fixed in the said box just above and in front of the said triangular glass prism, that the said screen only is reflected to the eye by the said emitting and refracting face.

3. In a photographic finder, the combination of: first, a negative lens suitably supported and fixed in the front opening of a box and perpendicularly to and first in the path of the light passing from the object or view through the finder to the eye; with, second, a triangular glass prism suitably supported and fixed just behind the said negative lens, below a top opening in the said box and in the said path of light, having two polished internally-reflecting faces one of which, not silvered, is placed or cut at such an angle to the other which is silvered that the former simultaneously transmits one part of, and totally reflects another part of, the same ray or pencil of light passing from the object or view through the finder to the eye.

4. In a finder, a prism having a final emitting-surface oblique to the emitted pencil of light, in combination with a screen so placed and sized as to be alone reflected to the eye by said surface.

In testimony whereof I have signed my name to this specification, in the presence of two subscribing witnesses, on this 21st day of January, A. D. 1896.

ALFRED CLIFFORD MERCER.

Witnesses:
CHAS. E. CHERRY,
HAMILTON BURDICK.